Patented Sept. 13, 1949

2,481,768

UNITED STATES PATENT OFFICE 2,481,768

TREATMENT OF SUGAR-BEARING SOLUTIONS

Gordon F. Mills, San Francisco, Calif., assignor to Chemical Process Company, San Francisco, Calif., a corporation of Nevada No Drawing. Application June 17, 1947,
Serial No. 755,245

2 Claims. (Cl. 127—46)

My invention relates to ion exchange treatment of sugar bearing solutions, and more particularly to the treatment of acid sugar bearing solutions containing substantial amounts or consisting entirely of so-called reducing sugars.

Reducing sugars are mono or disaccharides such as glucose, fructose, galactose, maltose, lactose, etc. which are defined as having the property of reducing copper or silver salts in alkaline solution. They contain free carbonyl groups, or groups capable of reacting as carbonyl groups, generally aldehydic or ketonic groups which form part of polyhydroxy compounds.

Resinous anion exchangers which are well known and which are characterized by available or active amine groups that impart exchange properties to the resin, are finding effective use in the treatment of acid reducing sugar containing solutions—such as occur in the production of dextrose from various starches by acid hydrolysis—to neutralize or reduce the acidity, and at the same time to remove whole molecules of various impurities, such as negatively charged organic complexes as colloids, gums and color bodies, and also to remove anions of various inorganic salts. A typical process of this character is disclosed in the patent to Cantor No. 2,328,191, dated August 31, 1943.

In such treatment of acid reducing sugar bearing solutions with aminated resinous anion exchangers, there has occurred a substantial and irreversible loss in exchange capacity of the anion exchanger resin with use, which could not be restored by the usual regeneration of the exchanger resin with the usual alkaline regenerating agents. Such loss naturally impairs the efficiency of the process, and also makes the process expensive because of the necessity of having to make relatively frequent replacements of spent exchangers with new exchangers. This problem becomes particularly aggravating when it is considered that the usual method of treatment of the solution with the exchanger is to pass the solution through a granular bed of the exchanger, and then regenerate the exchanger as frequently as regeneration is required.

The process of my invention is designed to overcome this problem; and my invention, therefore, has as its objects, among others, the provision of an improved process for the treatment of acid reducing sugar bearing solutions with resinous anion exchangers in such manner as to obviate the loss of exchanger capacity heretofore occurring in such type of treatment. Other objects will become apparent from a perusal of the following description.

I have found that the difficulty has arisen from the fact that heretofore aminated anion exchangers of the character related, contain substantial quantities of primary and secondary amines, i. e. amines that have two and one available hydrogen atoms, respectively. Although such exchangers perform entirely satisfactory in the treatment of most products, I have discovered that these available hydrogen atoms readily react with the carbonyl reacting groups occurring in reducing sugars and form stable reactive products that cannot be broken up by the usual alkali regeneration. This effect is what causes the cumulative loss in ion exchange or acid adsorbing capacity of the resin.

To prevent such loss of capacity, I employ aminated resinous anion exchangers for the purpose described, in which substantially all of the amine groups are in the form of tertiary amines, i. e., amines that have substantially no free or available hydrogen directly attached to the nitrogen. Such tertiary form of amine does not form the undesirable reaction products with the carbonyl reacting groups occurring in reducing sugars, which I found cause the loss in capacity of the exchanger. Furthermore, the tertiary form of amine resin is more resistant to oxidation than the primary and secondary amine forms of the same resin. I have also found that aminated resinous anion exchangers in which any substantial amount of amine is in the quaternary form, should be avoided in the treatment of the described acid reducing sugar bearing solutions to which my invention pertains.

The latter is so because aminated quaternary anion exchangers are strongly basic in character resulting in strongly alkaline solutions in which the carbonyl reacting groups of the reducing sugars undergo aldol condensation reactions which are catalyzed by the strong alkali, and such type of reaction results in formation of resinous or gummy bodies, color bodies and other undesirable constituents. Therefore, to achieve the objects of my invention, my anion exchanger resin for the treatment described will have the general formula:

wherein B stands for any of the usual resinous condensation reaction products which provide the framework to which active amine exchange groups are attached (hereinafter referred to as the resin "base") and which are characteristic of well known anion exchangers of the type described, N represents nitrogen, and R stands for any suitable alkyl or aryl group or substituted alkyl or aryl group replacing hydrogen thus providing the tertiary amine.

In the deacidification and purification of acid, reducing sugar bearing solutions, the method of my invention may be used with any of the particular methods now well known in the art, such as exemplified by the aforementioned Cantor Patent No. 2,328,191, because my method is not dependent on any particular mode of treatment, as it will function to prevent the described loss of capacity of the exchanger irrespective of the particular treatment applied to the acid reducing sugar bearing solution. Furthermore, my tertiary amine resinous anion exchanger can be regenerated in the well known manner by any suitable alkali, after removal is effected between the exchanger and the solution being treated. In this connection, the tertiary amine anion exchanger is substantially inert to or insoluble in the acid reducing sugar bearing solution; and it is preferred to effect the treatment of the acid reducing sugar bearing solution by passing it through a granular bed of the exchanger.

To convert any of the aminated resinous or organic anion exchangers to the form in which the amine is substantially entirely of the tertiary type, alkylation is employed. However, the exchanger should not be alkylated to such an extent as to result in any substantial proportion of quaternary amine groups in the final product, but the alkylation should be adequate and for a sufficient length of time to convert substantially all the amine groups to the tertiary form for the purpose explained. Any suitable method of and substances for alkylation may be employed, to achieve this result. In this connection, alkylation of anion exchangers of the type described has been employed in the art for the purpose of increasing capacity of the exchanger. Usually the alkylation has been to produce the quaternary form of amine in the exchanger, as this is the strongest base, but there has not been, to my knowledge, any special effort to form substantially only the tertiary amine in the resin for the method of my invention.

The most common alkylating agents heretofore employed are alkyl halides, alkyl sulfates or the like. It is extremely difficult to so control alkylation with agents of this type to alkylate the exchanger completely to the tertiary amine form without at the same time producing a substantial proportion of amine alkylated to the quaternary form, the latter being objectionable as was previously explained. I have found, however, certain preferred alkylating agents and conditions which will facilitate obtaining only the desired exchanger with the amine groups substantially entirely in the alkylated tertiary form, which will now be related.

The aminated organic anion exchanger resin itself, before alkylation, should preferably be in the free amine form rather than the salt of the amine in the exchanger because in the latter case, there is a tendency for the alkylation to proceed through the tertiary to the quaternary state. The alkylating medium should be substantially free of amine salts, and should be preferably neutral or slightly on the alkaline side. Such medium may be any suitable solvent for the alkylating agent, such as any of the usual alcohols but preferably water. The preferred alkylating agents include low molecular weight alkylene oxides, up to preferably not more than four (4) carbon atoms, such as ethylene oxide, propylene oxide, and epichlorhydrin. Also, low molecular weight, up to preferably not more than four (4) carbon atoms, alpha hydroxy, carbonyl compounds, such as glycolyl aldehyde and acetol, may be employed as alkylating agents.

Insofar as temperature of reaction is concerned, any suitable temperature at which the exchanger will not be affected adversely and alkylation may proceed, may be employed. Preferably, moderate heat is applied to expedite the reaction but the reaction can be conducted at room temperature. Temperatures above 100° C. are not preferred because although they may hasten the reaction, such temperatures may prove injurious to the exchanger.

The following examples are illustrative of my invention:

Example I

A well known phenol formaldehyde anion exchanger resin having amine groups resulting from amination with a polyethylene amine, was allowed to stand in the free amine regenerated condition and in granular form in contact with a twenty percent (20%) by weight solution of pure dextrose in water for forty-eight (48) days at room temperature. The exchanger showed a loss of capacity of about eleven percent (11%) at the end of this period. A sample of the same resin was alkylated to the tertiary amine form, with ethylene oxide by shaking the water wet, free amine exchanger with two (2.0) moles of the ethylene oxide for each equivalent of amine in the resin, for eight (8) hours at room temperature. During the first part of the reaction, the temperature rose to fifty to sixty degrees (50-60° C.) centigrade for a short period but returned to room temperature in the course of about one (1) hour.

The alkylated exchanger showed substantially none of the properties which would be expected if any substantial portion of the amine groups had been converted to the quaternary form. This exchanger when tested by contacting it in granular form with the twenty percent (20%) by weight solution of dextrose in water showed no loss in capacity at the end of forty-eight (48) days but showed a slight gain in its ability to adsorb acids.

Example II

A well known exchanger similar to that of Example I was alkylated to the tertiary form, with propylene oxide in the manner described with respect to Example I, and showed similar results.

Example III

Another well known anion exchanger resin made by reacting acetone, formaldehyde and tetraethylene pentamine in acid solution, was subjected in granular form to the 20% by weight water solution of pure dextrose for 48 days at room temperature. This resin resulted in about a seven and one-half percent (7.5%) loss in acid adsorbing capacity.

A sample of such water wet exchanger was alkylated to the tertiary amine state by treatment with two (2) moles of epichlorohydrin for each equivalent of amine present in the resin, at room temperature for six (6) hours. The thus alkylated resin in the regenerated condition was tested by contacting it in granular form with the twenty percent (20%) by weight dextrose solution in pure water for forty-eight (48) days at room temperature. The exchanger showed substantially no loss in capacity at the end of this period.

I claim:

1. The method of deacidifying and purifying an acid reducing-sugar bearing solution which comprises treating said solution with an organic anion exchanger having amine groups in which substantially all of the amine of substantially all of said exchanger is alkylated to the tertiary form to obviate reaction between carbonyl reacting groups of the sugar and the amine, and effecting removal between the solution and the exchanger.

2. The method of deacidifying and purifying an acid reducing-sugar bearing solution which comprises treating said solution with an organic aminated anion exchanger, obviating reaction between carbonyl reacting groups of the sugar and the amine groups of the exchanger by having such groups of substantially all of said exchanger alkylated substantially completely to the tertiary form, and effecting removal between the solution and the exchanger.

GORDON F. MILLS.

REFERENCES CITED

The following references are of record in the file of this patent:

UNITED STATES PATENTS

| Number | Name | Date |
|---|---|---|
| 2,228,514 | Griessbach | Jan. 14, 1941 |
| 2,319,649 | Walsh | May 18, 1943 |
| 2,341,907 | Cheetham | Feb. 15, 1944 |
| 2,389,119 | Cantor | Nov. 20, 1945 |
| 2,413,676 | Behrman | Jan. 7, 1947 |

FOREIGN PATENTS

| Number | Country | Date |
|---|---|---|
| 117,410 | Australia | Sept. 2, 1943 |